(12) United States Patent
Roehm et al.

(10) Patent No.: US 9,475,125 B2
(45) Date of Patent: Oct. 25, 2016

(54) TOOL ATTACHMENT FOR A HAND-HELD MACHINE TOOL

(71) Applicant: Robert Bosch GmbH, Stuttgart (DE)

(72) Inventors: Heiko Roehm, Stuttgart (DE); Torsten Tussing, Koengen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 32 days.

(21) Appl. No.: 14/075,309

(22) Filed: Nov. 8, 2013

(65) Prior Publication Data
US 2014/0131958 A1 May 15, 2014

(30) Foreign Application Priority Data

Nov. 15, 2012 (DE) .................. 10 2012 220 901
Jul. 15, 2013 (DE) .................. 10 2013 213 816

(51) Int. Cl.
| | |
|---|---|
| B23B 31/02 | (2006.01) |
| B25F 3/00 | (2006.01) |
| B23B 45/00 | (2006.01) |
| B25B 21/00 | (2006.01) |

(52) U.S. Cl.
CPC .............. B23B 31/02 (2013.01); B25F 3/00 (2013.01); *B23B 45/003* (2013.01); *B25B 21/007* (2013.01); *Y10T 279/26* (2015.01)

(58) Field of Classification Search
CPC ....... B23B 45/003; B23B 31/02; B25F 3/00; B25B 21/007; B25B 23/0035; Y10T 279/26; Y10T 279/3406; Y10T 279/34

USPC ............ 279/133, 142–145; 408/238, 239 R, 408/239 A, 240; 30/500; 7/158, 165

See application file for complete search history.

(56) References Cited

U.S. PATENT DOCUMENTS

| | | | | |
|---|---|---|---|---|
| 2,970,843 | A * | 2/1961 | Bourguignon | 279/2.03 |
| 3,049,358 | A * | 8/1962 | Polos | 279/102 |
| 3,712,632 | A * | 1/1973 | Wightman et al. | 279/62 |
| 4,496,163 | A * | 1/1985 | Bernfeld | 279/145 |
| 4,824,298 | A * | 4/1989 | Lippacher et al. | 408/240 |
| 5,110,145 | A * | 5/1992 | Stewart | B23B 45/003 |
| | | | | 279/145 |
| 5,737,985 | A * | 4/1998 | Rimlinger, Jr. | 82/165 |
| 5,944,329 | A * | 8/1999 | Salzer et al. | 279/128 |
| 6,357,974 | B1 * | 3/2002 | Robins | 408/240 |
| 6,543,959 | B1 * | 4/2003 | Jore | 403/322.2 |
| 7,243,923 | B2 * | 7/2007 | Campbell et al. | 279/133 |
| 7,478,979 | B2 * | 1/2009 | Zhou et al. | 408/240 |
| 7,481,608 | B2 * | 1/2009 | Zhou et al. | 408/240 |
| 2003/0077136 | A1 * | 4/2003 | Rohm | 408/239 R |
| 2011/0081212 | A1 * | 4/2011 | Spichtinger et al. | 407/102 |

FOREIGN PATENT DOCUMENTS

| | | | | |
|---|---|---|---|---|
| DE | 20 2006 014 850 | | 11/2006 | |
| EP | 492729 | A1 * | 7/1992 | B23B 31/22 |
| FR | 1084235 | A * | 1/1955 | B23B 45/003 |

* cited by examiner

*Primary Examiner* — Sunil K Singh
*Assistant Examiner* — Ryan Rufo
(74) *Attorney, Agent, or Firm* — Norton Rose Fulbright US LLP

(57) ABSTRACT

A tool attachment has: a mounting unit for mounting on a mounting interface of a hand-held machine tool; and a centering aid provided on the mounting unit for axially centering the mounting unit on the mounting interface.

20 Claims, 3 Drawing Sheets

TOOL ATTACHMENT FOR A HAND-HELD MACHINE TOOL

BACKGROUND OF THE INVENTION

1. Field of the Invention

The present invention relates to a tool attachment having a mounting unit for mounting on a mounting interface of a hand-held machine tool.

2. Description of the Related Art

The related art describes such a tool attachment formed in the manner of a drill-chuck attachment that has a mounting unit for mounting on a mounting interface of a hand-held machine tool. This mounting unit is used to lock the drill-chuck attachment on the hand-held machine tool in order to prevent removal of the drill-chuck attachment from the hand-held machine tool during its operation, when a drive torque is transferred from the hand-held machine tool to the drill-chuck attachment. To permit a corresponding torque transfer, a drive shaft assigned to the drill-chuck attachment engages in a tool holder assigned to the hand-held machine tool and is driven rotationally by it.

The disadvantage in the related art is that the tool attachment in the form of a drill-chuck attachment is centered axially on the hand-held machine tool exclusively via the drive shaft of the drill-chuck attachment disposed in the tool holder of the hand-held machine tool, so that such a drill-chuck attachment is only able to exhibit inadequate smooth-running characteristics. In this case, an imbalance at the drill-chuck attachment during operation of the hand-held machine tool may result in damage to the drill-chuck attachment and/or the tool holder of the hand-held machine tool.

BRIEF SUMMARY OF THE INVENTION

An object of the present invention is therefore to provide a new tool attachment, especially a drill-chuck attachment, having improved smooth-running characteristics.

This objective is achieved by a tool attachment having a mounting unit for mounting on a mounting interface of a hand-held machine tool. A centering aid is provided on the mounting unit for axially centering the mounting unit on the mounting interface.

The present invention therefore makes it possible to provide a tool attachment for which robust and reliable axial centering of the tool attachment on an assigned hand-held machine tool may be permitted by the use of a centering aid, so that improved smooth-running characteristics of the tool attachment during operation of the assigned hand-held machine tool may be achieved in an easy manner.

According to one specific embodiment, the centering aid is at least sectionally conical.

The invention thus makes it possible to provide a tool attachment having a mounting unit that has an uncomplicated and cost-effective centering aid.

Preferably, the centering aid is formed at least sectionally in the manner of a ring having an outer circumference that is beveled at least in some areas.

A robust and stable centering aid may thus be provided.

Preferably, the centering aid is formed at an axial end area of the mounting unit.

Thus, a centering aid may be provided which is able to be produced quickly and with comparatively low expenditure.

The centering aid is preferably designed to engage with an at least sectionally funnel-shaped centering aid provided on the mounting interface of the hand-held machine tool.

Therefore, two simple and easily producible complementary geometrical shapes may be used for efficient axial centering.

According to one specific embodiment, the mounting unit is designed for mounting on the mounting interface of the hand-held machine tool in a manner protected against twisting.

The invention thus makes it possible to provide a tool attachment for which a stable and low-wear connection to the hand-held machine tool is permitted by mounting on the mounting interface of the hand-held machine tool in a manner protected against twisting.

Preferably, the tool attachment is formed in the manner of a drill-chuck attachment, and a clamping-chuck unit is provided which is rotationally mounted on the mounting unit.

Consequently, a respective number of components driven rotationally during operation of the hand-held machine tool may be reduced in an easy manner, so that the occurrence of an imbalance may at least be curtailed, and thus a tool attachment in the form of a drill-chuck attachment having improved smooth-running characteristics may be provided.

The objective indicated at the outset is also achieved by a hand-held machine tool having a mounting interface for mounting a mounting unit of a tool attachment. An at least sectionally conical centering aid is provided on the mounting interface for the axial centering of the mounting unit of the tool attachment.

Moreover, the objective indicated at the outset is also achieved by a tool system having a hand-held machine tool and a tool attachment that has a mounting unit for mounting on a mounting interface of the hand-held machine tool. Provided on the mounting unit and the mounting interface are complementary geometrical shapes which are designed to mesh for the axial centering of the mounting unit on the mounting interface.

The present invention therefore makes it possible to provide a tool system in which robust and reliable axial centering of the tool attachment on the hand-held machine tool may be enabled by joining together geometrical shapes that are complementary relative to each other, so that improved smooth-running characteristics of the tool attachment during operation of the assigned hand-held machine tool may be achieved in an easy manner.

According to one specific embodiment, the complementary geometrical shapes are designed to produce a form-locking connection in the axial direction of the mounting unit.

Thus, a secure and stable axial centering of the tool attachment on the hand-held machine tool may be rendered possible.

DETAILED DESCRIPTION OF THE INVENTION

Figure 1:
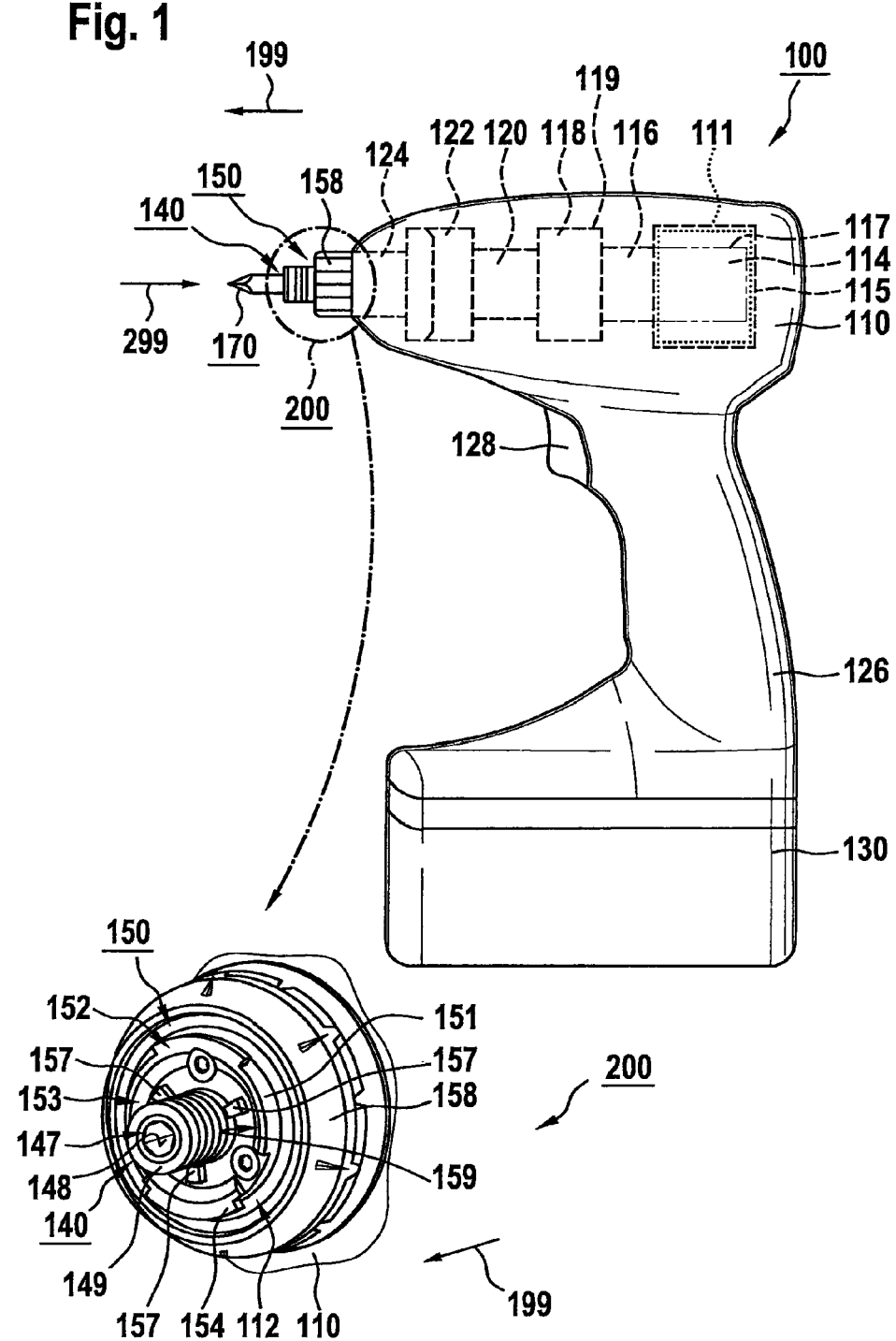
FIG. 1 shows a schematic view of a hand-held machine tool having a tool holder and a mounting interface according to one specific embodiment.

FIG. 1 shows a hand-held machine tool 100 which is provided with a tool holder 140 and has a housing 110 having a hand grip 126, as well as an enlarged cut-away portion 200 of hand-held machine tool 100. According to one specific embodiment, hand-held machine tool 100 is connectable mechanically and electrically to a battery pack 130 for the cordless power supply.

By way of example, hand-held machine tool 100 is in the form of a cordless rotary-impact screwdriver. However, it is pointed out that the present invention is not limited to cordless rotary-impact screwdrivers, but rather may be used for various hand-held machine tools which have a tool holder corresponding to tool holder 140, regardless of whether the hand-held machine tool is operable electrically, i.e., in battery-powered fashion with battery pack 130 or in mains-dependent fashion, and/or non-electrically.

Disposed in housing 110 are an electric drive motor 114, supplied with current by battery pack 130, a gear unit 118 and an optional striking mechanism 122. For example, drive motor 114 is operable, that is, is able to be switched on and off, via a manual switch 128, and preferably is able to be controlled or regulated electronically in such a way that both a reverse operation as well as setpoint selections with respect to a desired rotational speed are able to be realized.

According to one specific embodiment, drive motor 114 is an electronically commutated drive motor, preferably a direct-current motor, which illustratively has stator and rotor components 111 and 117, respectively. In this context, for example, stator components 111 form an outer stator and, for instance, rotor components 117 form an inner rotor. However, it is pointed out that the description of a drive motor taking the form of an electronically commutated drive motor with outer stator and inner rotor has merely an exemplary character, and is not to be understood as a limitation of the invention which may also be used in the case of a drive motor having an inner stator and an outer rotor or, for example, for a commutator motor with brush gear.

Drive motor 114 is connected via an assigned motor shaft 116 to gear unit 118, which converts a rotation of motor shaft 116 into a rotation of a driving element 120, e.g., a drive shaft, provided between gear unit 118 and striking mechanism 122. Preferably, this conversion takes place in such a way that driving element 120 rotates with increased torque relative to motor shaft 116, but reduced rotational speed. Drive motor 114 is situated illustratively in a motor housing 115 and gear unit 118 is in a gear housing 119, gear housing 119 and motor housing 115 being disposed, e.g., in housing 110.

For example, optional striking mechanism 122, connected to driving element 120, is a rotary or rotational striking mechanism that generates rapid rotary pulses with high intensity and transfers them to a drive shaft 124, e.g., a drive spindle. An exemplary striking mechanism with which striking mechanism 122 may be realized is described in German utility model DE 20 2006 014 850 U1, to which explicit reference is made here, and whose teachings are to be understood as a part of the present specification, so that a detailed description of striking mechanism 122 is omitted here in order to keep the specification brief.

Tool holder 140 is formed on drive shaft 124, and illustratively has a receiving member 147 having inner multi-edge receiver 148 which is provided to accommodate insert tools having external multi-edge couplings. Disposed, for example, at the periphery of receiving member 147, which is joined in rotationally fixed manner to and/or is formed in one piece with drive shaft 124, for instance, is a locking sleeve 149 which is acted upon by a spring element (145 in FIG. 2) in an axial direction 199 pointing away from hand-held machine tool 100, in order to lock suitable insert tools in inner multi-edge receiver 148.

For example, tool holder 140 is formed in the manner of a bit holder, i.e., for receiving an insert tool 170 taking the form of a screwdriver bit, which is inserted in the direction of hand-held machine tool 100, as indicated by an arrow 299, into inner multi-edge receiver 148. Such a screwdriver bit which, for example, is of what is known as the hex type, is sufficiently familiar from the related art, so that for the purpose of keeping the specification concise, a detailed description is omitted here. However, it is pointed out that the present invention is not limited to the use of hex screwdriver bits, but rather, other insert tools, e.g., hex drill bits or what are known as SDS quick drill bits may also be used, depending on the form of tool holder 140 selected in each case. Moreover, it is pointed out that the construction and functioning method of a suitable bit holder are sufficiently familiar to one skilled in the art, so that a detailed description of bit holder 140 is omitted here in order to keep the specification brief.

According to one specific embodiment, hand-held machine tool 100 is assigned a mounting interface 150, which illustratively is secured in axially and radially immovable fashion in the area of bit holder 140 on gear housing 119 or directly on housing 110, and for the purpose of clarity of the description, is denoted hereinafter as "machine interface 150." However, it is pointed out that machine interface 150 is formed as a separate component only by way of example, and alternatively, may also be formed in one piece with gear housing 119 or housing 110.

Machine interface 150 is used at least for mounting an assigned drill-chuck attachment (350 in FIG. 3) in a manner protected against twisting, and illustratively has a mounting element 151 secured in a manner protected against twisting at an end face 112 of housing 110 on gear housing 119 or housing 110. For instance, mounting element 151 is sleeve-shaped or ring-shaped at least in sections, and is secured in the area of a terminal or protective sleeve 158, disposed annularly at end face 112 on housing 110, using suitable fastening components, e.g., screws or rivets, but as an alternative, may also be formed in one piece with gear housing 119 or housing 110. Preferably, mounting element 151 jackets bit holder 140 at least sectionally with a predefined radial clearance in order to permit an axial shift of locking sleeve 149 of bit holder 140 in the interior of mounting element 151.

However, it is pointed out that machine interface 150 is formed for mounting a drill-chuck attachment (350 in FIG. 3) in a manner protected against twisting only as an example, and not to restrict the invention. Rather, other tool attachments such as an angle attachment or an eccentric attachment may also be mounted on machine interface 150 in a manner protected against twisting.

As illustration, at its outer circumference, mounting element 151 has at least two holding elements 152, 154, which are formed in the manner of bayonets in order to produce a bayonet joint. However, it is pointed out that the description of such a bayonet joint has only an exemplary character, and does not serve as a restriction of the invention. Rather, alternative fastening possibilities may also be used in the case of machine interface 150, such as what is termed a wire-strap locking or a spherical locking, etc.

According to one specific embodiment, provided on machine interface 150 is an at least sectionally conical centering aid 153 for the axial centering of a mounting unit (302 in FIG. 3) of an assigned tool attachment (350 in FIG. 3), preferably in the form of a drill-chuck attachment.

Illustratively, mounting element 151 is designed to permit the axial centering of the assigned tool attachment (350 in FIG. 3) on gear housing 119 and/or housing 110, as described below in connection with FIG. 3. To that end, at the inner circumference of mounting element 151, an exemplary annular, at least sectionally funnel-shaped centering surface 159 is provided for forming centering aid 153.

However, it is pointed out that centering surface 159 is funnel-shaped only by way of example, and not as a restriction of the invention. Rather, a tapered form may also be realized on an additional centering ring. Accordingly, a reference to the term "conical" within the context of the present invention represents a reference both to a tapered and to a funnel-shaped form of a corresponding component. Moreover, instead of a single annular and funnel-shaped centering surface 159, centering aid 153 may have a plurality of conical curved sections, etc.

In addition, mounting element 151 has at least one and, exemplarily, three optional angular-adjustment elements 157.

For example, they are used for setting a predefined angular position when mounting an angle attachment or eccentric attachment on machine interface 150.

Figure 2:
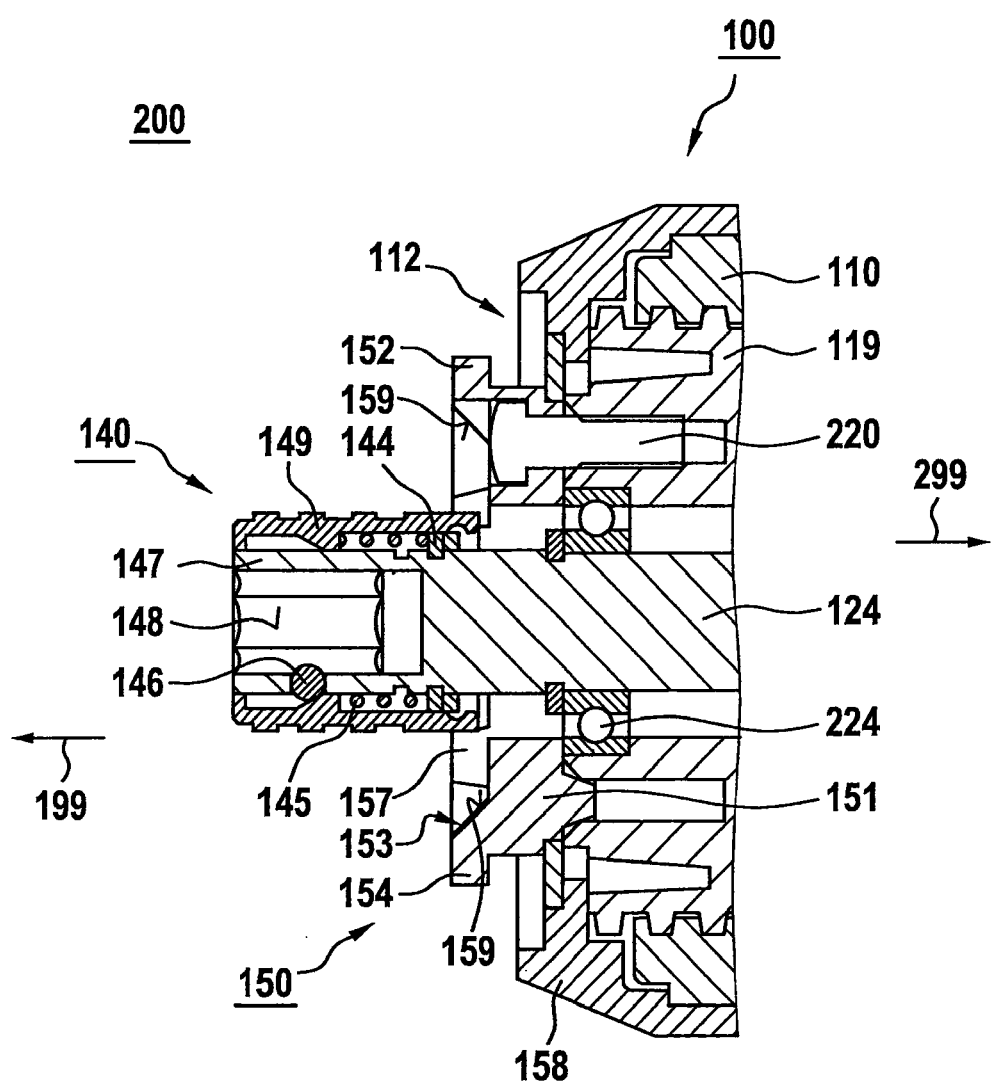
FIG. 2 shows a sectional view of a cut-away portion of the hand-held machine tool from FIG. 1.

FIG. 2 shows cut-away portion 200 of hand-held machine tool 100 of FIG. 1 in a sectional view for the purpose of illustrating an exemplary form of bit holder 140 as well as of machine interface 150 of FIG. 1. As described in connection with FIG. 1, bit holder 140 is formed on drive shaft 124 of FIG. 1, which, for example, is rotationally mounted in a bearing element 224, e.g., a rolling-contact bearing, situated in housing 110, preferably in gear housing 119, of hand-held machine tool 100.

Illustratively, bit holder 140 has receiving member 147 having inner multi-edge receiver 148 as well as locking sleeve 149 of FIG. 1. For example, locking sleeve 149 is used to act radially on at least one locking element 146, e.g., a locking sphere, and is spring-loaded by an assigned spring element 145, which is braced against a retaining ring 144 held on drive shaft 124, in axial direction 199 pointing away from hand-held machine tool 100. To release tool holder 140, locking sleeve 149 must be shifted against a spring force applied by spring element 145, in the direction of end face 112 of hand-held machine tool 100, thus permitting the at least one locking sphere 146 to move radially outwards.

Moreover, by way of example, FIG. 2 clarifies fastening components 220, formed in the manner of screws, by which mounting element 151 of machine interface 150 is secured to end face 112. In addition, FIG. 2 clarifies the exemplary funnel-shaped form of centering surface 159 of centering aid 153 of mounting element 151.

Figure 3:
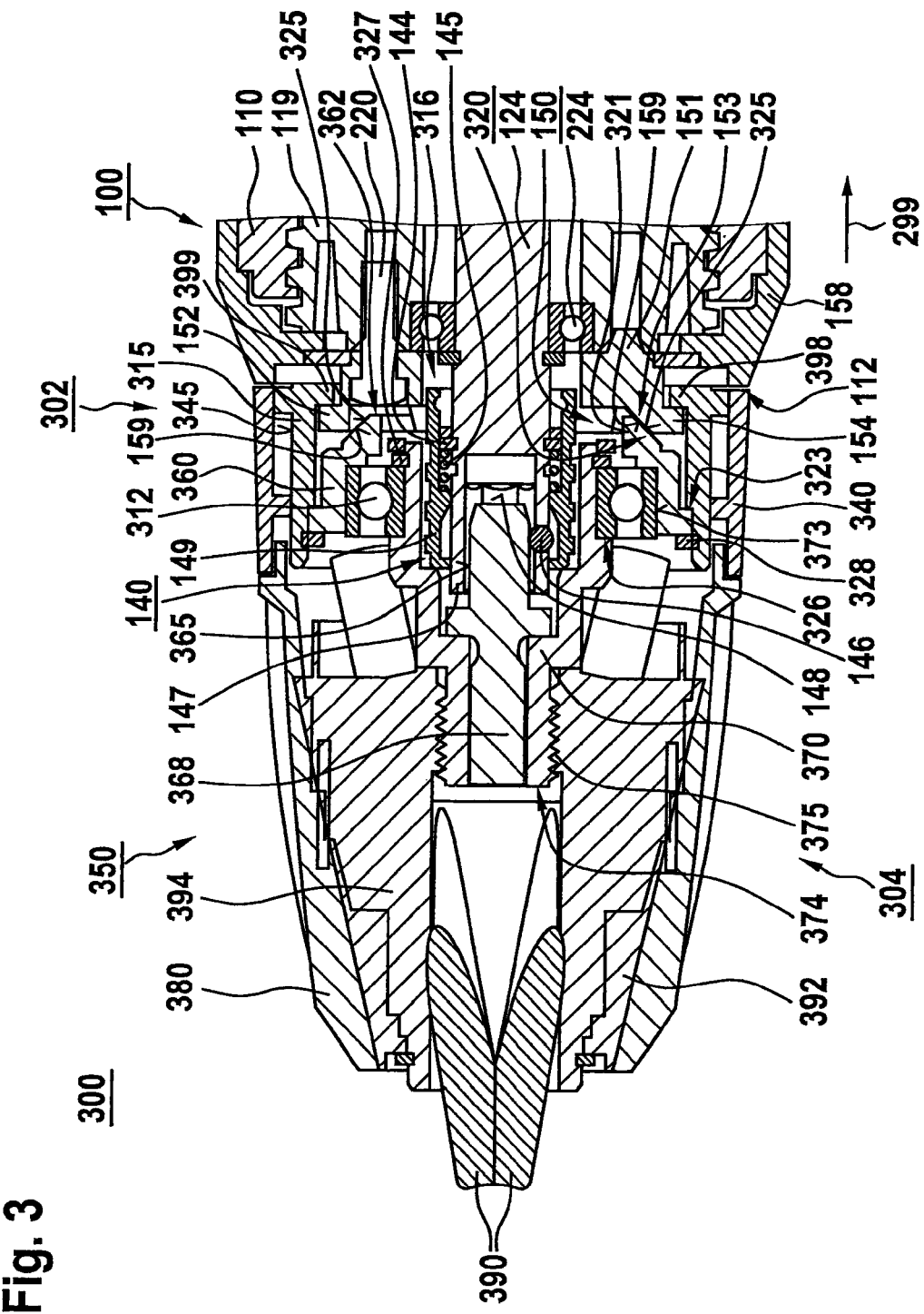
FIG. 3 shows a sectional view of a tool system according to one specific embodiment, having a tool attachment formed according to one specific embodiment as a drill-chuck attachment and mounted on the hand-held machine tool from FIG. 1.

FIG. 3 shows an exemplary tool system 300, which illustratively has hand-held machine tool 100 of FIG. 1 and an exemplary tool attachment 350. In this case, hand-held machine tool 100 is shown only sectionally with the aid of a cut-away portion of gear housing 119 or of housing 110 of FIG. 1, at whose end face 112 machine interface 150 of FIGS. 1 and 2 is disposed, and in which drive shaft 124 is rotationally mounted in illustrative rolling-contact bearing 224 of FIG. 2, tool holder 140 of FIGS. 1 and 2 being disposed on drive shaft 124.

According to one specific embodiment, tool attachment 350 is designed for mounting on machine interface 150 of hand-held machine tool 100 in a manner protected against twisting. Preferably, tool attachment 350 takes the form of a drill-chuck attachment, and therefore is also denoted as "drill-chuck attachment 350" within the context of the present invention. However, it is pointed out that tool attachment 350 is formed as a drill-chuck attachment only by way of example, and not to restrict the invention. Rather, tool attachment 350 may have any form as desired, e.g., a type of angle attachment, eccentric attachment, etc., which, as described above, are likewise able to be mounted on machine interface 150 of hand-held machine tool 100 in a manner protected against twisting.

By way of example, drill-chuck attachment 350 has a mounting unit 302 as well as a clamping-chuck unit 304. Clamping-chuck unit 304 has a supporting member 394, for example, on which a plurality of clamping jaws 390 are supported, which are able to be actuated via a clamping member 392, provided with a clamping sleeve 380, in order to clamp an assigned insert tool, e.g., a round drill. For example, supporting member 394 is fastened in a manner protected against twisting via a screw connection 375 to a first axial end area 374 of an actuating element 370 assigned to mounting unit 302, so that in response to a rotational motion of actuating element 370, supporting member 394 rotates with it. Alternatively, supporting member 394 may also be joined to actuating element 370 by a press-fit connection, or perhaps be formed in one piece with it. Illustratively, a drive shaft 368 is accommodated in a manner protected against twisting in at least sectionally sleeve-shaped actuating element 370, so that in response to a rotational motion of drive shaft 368, actuating element 370 rotates with it. Alternatively, drive shaft 368 and actuating element 370 may also be formed in one piece.

A multi-edge entrainment contour 365 is formed at a free axial end of drive shaft 368, the free axial end exemplarily being accommodated in a second axial end area of actuating element 370. A periphery of the second axial end area of actuating element 370 is rotationally mounted in a bearing element 312 assigned to mounting unit 302, e.g., in a rolling-contact bearing formed in the manner of a radial bearing, or preferably is pressed into it, so that clamping-chuck unit 304 is rotationally mounted on mounting unit 302. In this context, bearing element 312 is fixed axially in position in the axial direction of actuating element 370 between an annular shoulder 326 formed on it and a retaining ring 327 secured to it. However, it is pointed out that a suitable implementation of clamping-chuck unit 304 is sufficiently familiar from the related art, so that a detailed description of clamping-chuck unit 304 may be omitted here in order to keep the specification concise.

Mounting unit 302 is designed for mounting on machine interface 150 of hand-held machine tool 100 in a manner protected against twisting and, for example, has a base member 315, at whose outer circumference at least two holding elements 398, 399 are provided which, for instance, are formed in the manner of bayonets in order to produce a bayonet joint with bayonets 152, 154 of machine interface 150. Base member 315 forms an interior space 316 and has an outer circumference 345, at which illustratively an actuating and locking sleeve 340 is disposed. Moreover, base member 315 illustratively has an inner annular shoulder 323 and an inner retaining ring 328 secured to its inner circumference, a centering element 360, for example, being fixed axially in position in the area between annular shoulder 323 and retaining ring 328. Alternatively, this centering element 360 may also be formed in one piece with base member 315, or integrally molded on it. For example, bearing element 312 is disposed and preferably pressed in at inner circumference 373 of centering element 360.

According to one specific embodiment, complementary geometrical shapes are provided on mounting unit 302 and machine interface 150 of hand-held machine tool 100, the shapes being designed to mesh in order to axially center mounting unit 302 on machine interface 150. These complementary geometrical shapes are configured to produce a form-locking connection in the axial direction of the mounting unit. Therefore, complementary geometrical shapes within the context of the present invention are to be understood quite generally as geometrical shapes which are able to be joined together to produce a form-locking connection.

Illustratively, centering element 360 of mounting unit 302 has at least one centering aid 320 which is at least sectionally conical. It is provided to engage with at least sectionally funnel-shaped centering aid 153, provided on machine interface 150 of hand-held machine tool 100, and preferably is formed at least sectionally in the manner of a ring 321 having an outer circumference 325, beveled at least in some areas, at an axial end area 362 of mounting unit 302. Alternatively, instead of ring 321, for example, centering aid 320 may have a plurality of conical curved sections, etc.

In order to mount drill-chuck attachment 350 on machine interface 150 of hand-held machine tool 100, drill-chuck attachment 350 is brought in direction 299 of FIG. 1 toward machine interface 150 and positioned on it in such a way that actuating element 370 is brought into contact with locking sleeve 149 of tool holder 140 of hand-held machine tool 100, so that the free end of drive shaft 368 engages at least sectionally in empty inner multi-edge receiver 148 of tool holder 140, and is prevented from a complete engagement by the at least one locking sphere 146 of FIG. 2. This locking sphere 146, or other suitable locking elements, are acted upon radially inwards by locking sleeve 149 of tool holder 140 in a manner familiar to one skilled in the art, for example, to thus prevent an unhindered insertion of drive shaft 368 into inner multi-edge receiver 148.

In a further step, drill-chuck attachment 350 is now slid in direction 299 onto machine interface 150, e.g., until base member 315 abuts against mounting element 151 of machine interface 150, so that by rotating actuating and locking sleeve 340, bayonets 398, 399 provided on base member 315 are able to be brought into engagement with bayonets 152, 154 of mounting element 151, and thus locked on them, so that mounting unit 302 is detachably secured and locked on machine interface 150.

Moreover, in the process, at least sectionally conical centering aid 320 of mounting unit 302 is brought into contact with at least sectionally funnel-shaped centering aid 153 of machine interface 150. Thus, secure and reliable axial centering of drill-chuck attachment 350 on machine interface 150 of hand-held machine tool 100 may be rendered possible.

However, it is pointed out again that centering aids 320 and 153 are conical only by way of example and not to restrict the invention. Rather, as described above, they only have to have suitable complementary geometrical shapes in order to produce a form-locking connection. Accordingly, centering aid 153 of machine interface 150 may be funnel-shaped, for instance, as shown in FIGS. 1 through 3, while centering aid 320 of drill-chuck attachment 350 is cylindrical or ring-shaped, for example. Alternatively, as described above, centering aid 320 of drill-chuck attachment 350 may be conical, i.e., tapered or funnel-shaped, for example, while centering aid 153 of machine interface 150 is cylindrical or ring-shaped, etc.

What is claimed is:

1. A tool attachment, comprising:
   a mounting unit for mounting on a mounting interface of a hand-held machine tool in a manner fixed against rotation;
   a centering aid provided on the mounting unit for axial centering of the mounting unit on the mounting interface; and
   a drive shaft rotatably supported relative to the mounting unit;
   wherein the mounting unit includes a centering element including the centering aid, the centering element being fixed against rotation,
   wherein the mounting unit includes a base member which is fixed against rotation,
   wherein the base member includes at least one holding member configured to be releasably connected to the mounting interface of the hand-held machine tool.

2. The tool attachment as recited in claim 1, wherein the base member includes two holding elements embodied as bayonets configured to produce a bayonet coupling with corresponding bayonets of the mounting interface of the hand-held machine tool.

3. The tool attachment as recited in claim 1, wherein the centering aid is at least sectionally conical.

4. The tool attachment as recited in claim 1, wherein the centering aid is formed at least sectionally in the form of a ring having an outer circumference which is beveled at least in selected areas.

5. The tool attachment as recited in claim 1, wherein the centering aid is formed at an axial end area of the mounting unit, the axial end area being oriented towards the mounting interface of the hand-held machine tool when the tool attachment is mounted on the hand-held machine tool.

6. The tool attachment as recited in claim 1, wherein the centering aid is configured to engage with an at least sectionally funnel-shaped centering aid provided on the mounting interface of the hand-held machine tool.

7. The tool attachment as recited in claim 1, wherein the tool attachment is formed in the manner of a drill-chuck attachment, and wherein the tool attachment further comprises a clamping-chuck unit which is rotationally mounted on the mounting unit.

8. A tool attachment, comprising:
   a mounting unit for mounting on a mounting interface of a hand-held machine tool in a manner fixed against rotation;
   a centering aid provided on the mounting unit for axial centering of the mounting unit on the mounting interface; and
   a drive shaft rotatably supported relative to the mounting unit;
   wherein the mounting unit includes a centering element including the centering aid, the centering element being fixed against rotation,
   wherein the mounting unit includes a base member which is fixed against rotation,
   wherein the mounting unit includes an actuating and locking sleeve which is rotatably mounted relative to the base member.

9. The tool attachment as recited in claim 8, wherein the centering aid is at least sectionally conical.

10. The tool attachment as recited in claim 8, wherein the centering aid is formed at least sectionally in the form of a ring having an outer circumference which is beveled at least in selected areas.

11. The tool attachment as recited in claim 8, wherein the centering aid is formed at an axial end area of the mounting unit, the axial end area being oriented towards the mounting interface of the hand-held machine tool when the tool attachment is mounted on the hand-held machine tool.

12. The tool attachment as recited in claim 8, wherein the centering aid is configured to engage with an at least sectionally funnel-shaped centering aid provided on the mounting interface of the hand-held machine tool.

13. The tool attachment as recited in claim 8, wherein the tool attachment is formed in the manner of a drill-chuck attachment, and wherein the tool attachment further comprises a clamping-chuck unit which is rotationally mounted on the mounting unit.

14. A tool attachment, comprising:
- a mounting unit for mounting on a mounting interface of a hand-held machine tool in a manner fixed against rotation;
- a centering aid provided on the mounting unit for axial centering of the mounting unit on the mounting interface;
- a drive shaft rotatably supported relative to the mounting unit; and
- an actuating element rotatably supported relative to the mounting unit, the actuating element being configured to act on a locking sleeve of a tool holder of the hand-held machine tool upon mounting the tool attachment on the mounting interface of the hand-held machine tool,
- wherein the mounting unit includes a centering element including the centering aid, the centering element being fixed against rotation.

15. The tool attachment as recited in claim 14, wherein the mounting unit includes a base member which is fixed against rotation.

16. The tool attachment as recited in claim 14, wherein the centering aid is at least sectionally conical.

17. The tool attachment as recited in claim 14, wherein the centering aid is formed at least sectionally in the form of a ring having an outer circumference which is beveled at least in selected areas.

18. The tool attachment as recited in claim 14, wherein the centering aid is formed at an axial end area of the mounting unit, the axial end area being oriented towards the mounting interface of the hand-held machine tool when the tool attachment is mounted on the hand-held machine tool.

19. The tool attachment as recited in claim 14, wherein the centering aid is configured to engage with an at least sectionally funnel-shaped centering aid provided on the mounting interface of the hand-held machine tool.

20. The tool attachment as recited in claim 14, wherein the tool attachment is formed in the manner of a drill-chuck attachment, and wherein the tool attachment further comprises a clamping-chuck unit which is rotationally mounted on the mounting unit.

\* \* \* \* \*